US011627015B2

(12) United States Patent
Wu et al.

(10) Patent No.: US 11,627,015 B2
(45) Date of Patent: Apr. 11, 2023

(54) SIGNAL RELAY SYSTEM WITH REDUCED POWER CONSUMPTION

(71) Applicant: ITE Tech. Inc., Hsinchu (TW)

(72) Inventors: Tsung-Han Wu, Changhua County (TW); Dong-Shan Chen, Hsinchu County (TW)

(73) Assignee: ITE Tech. Inc., Hsinchu (TW)

(*) Notice: Subject to any disclaimer, the term of this patent is extended or adjusted under 35 U.S.C. 154(b) by 280 days.

(21) Appl. No.: 17/083,322

(22) Filed: Oct. 29, 2020

(65) Prior Publication Data

US 2022/0029852 A1 Jan. 27, 2022

(30) Foreign Application Priority Data

Jul. 24, 2020 (TW) ................................ 109125046

(51) Int. Cl.
*H04L 12/40* (2006.01)
*G06F 1/3203* (2019.01)
*H04L 12/12* (2006.01)

(52) U.S. Cl.
CPC ...... *H04L 12/40039* (2013.01); *G06F 1/3203* (2013.01); *H04L 12/12* (2013.01)

(58) Field of Classification Search
CPC . H04L 12/40039; H04L 12/12; G06F 1/3203; G06F 1/3209; G06F 1/3234; G06F 1/3246
See application file for complete search history.

(56) References Cited

U.S. PATENT DOCUMENTS 2,748,197 A * 5/1956 Ostline ................. H04M 15/08 379/32.02
2,976,406 A * 3/1961 Staples ................... B61L 17/00 246/182 A
3,226,541 A * 12/1965 Brinker ................... B61L 17/00 246/2 R
3,247,372 A * 4/1966 Fitzsimmons .......... B61L 17/00 246/182 A
4,022,407 A * 5/1977 Staples ................. B61L 23/168 246/34 R (Continued)

FOREIGN PATENT DOCUMENTS

CA 3057232 A1 * 11/2018 ......... E21B 47/0228
CN 1965483 A * 5/2007 ......... H03K 17/6872

(Continued)

*Primary Examiner* — Berhanu Tadese
(74) *Attorney, Agent, or Firm* — Winston Hsu

(57) ABSTRACT

A signal relay system includes an input terminal, an output terminal, a signal detector, a signal repeater, an input terminal circuit, an output terminal circuit, a switch and a switch controller. The signal detector is for detecting a wakeup signal from the input terminal. The signal repeater is for receiving a transmission signal and to amplify and forward the transmission signal. The input terminal circuit is for reducing impedance between the input terminal and the signal repeater. The output terminal circuit is for reducing impedance between the output terminal and the signal repeater. The switch is for coupling the output terminal to the signal repeater or the input terminal. The switch controller is for operating the switch according to a detection result of the signal detector.

7 Claims, 2 Drawing Sheets

(56) References Cited

U.S. PATENT DOCUMENTS

| | | | | | |
|---|---|---|---|---|---|
| 5,819,028 | A | * | 10/1998 | Manghirmalani | H04L 41/046 709/224 |
| 5,838,580 | A | * | 11/1998 | Srivatsa | G06F 30/39 716/134 |
| 6,111,432 | A | * | 8/2000 | Gerber | H04L 25/029 326/97 |
| 6,425,094 | B1 | * | 7/2002 | Drogichen | G06F 11/2284 712/30 |
| 6,760,868 | B2 | * | 7/2004 | Drogichen | G06F 11/2284 714/41 |
| 7,119,580 | B2 | * | 10/2006 | Masleid | H04L 25/242 326/23 |
| 7,304,503 | B2 | * | 12/2007 | Masleid | H03K 19/018585 326/23 |
| 7,570,167 | B2 | * | 8/2009 | Fein | G06Q 30/0601 235/487 |
| 7,592,839 | B2 | * | 9/2009 | Masleid | H03K 19/01721 326/23 |
| 7,631,023 | B1 | * | 12/2009 | Kaiser | G06F 16/10 711/170 |
| 7,634,975 | B2 | * | 12/2009 | Kates | A01K 15/02 119/908 |
| 7,711,978 | B1 | * | 5/2010 | Roy | G06F 11/201 714/43 |
| 7,859,309 | B2 | * | 12/2010 | Lo | G06F 1/10 327/295 |
| 8,082,474 | B2 | * | 12/2011 | Ferraiolo | G06F 11/1004 714/704 |
| 8,223,018 | B2 | * | 7/2012 | Fein | G06Q 20/20 340/5.91 |
| 8,234,540 | B2 | * | 7/2012 | Buchmann | H03M 13/13 714/752 |
| 8,499,021 | B2 | * | 7/2013 | Jarosinski | G06F 17/15 708/316 |
| 8,516,338 | B2 | * | 8/2013 | Buchmann | H03M 13/13 714/752 |
| 8,604,928 | B2 | * | 12/2013 | Fein | G06Q 20/20 340/5.91 |
| 8,761,075 | B2 | * | 6/2014 | Kim | H04B 7/0413 370/339 |
| 8,797,067 | B1 | * | 8/2014 | Tan | H04L 25/03343 327/47 |
| 8,797,835 | B1 | * | 8/2014 | Zhang | H04B 3/487 370/201 |
| 8,948,078 | B2 | * | 2/2015 | Speight | H04B 7/15 455/7 |
| 9,030,999 | B2 | * | 5/2015 | Shen | H04B 7/14 370/328 |
| 9,054,771 | B2 | * | 6/2015 | Kim | H04B 7/0413 |
| 9,219,537 | B2 | * | 12/2015 | Chen | H04W 24/02 |
| 9,312,946 | B2 | * | 4/2016 | Van Phan | H04W 16/26 |
| 9,400,212 | B2 | * | 7/2016 | Elliott | G09F 9/33 |
| 9,679,854 | B2 | * | 6/2017 | Huang | H04L 25/20 |
| 9,986,367 | B2 | * | 5/2018 | Iwai | H04W 48/16 |
| 10,050,623 | B2 | * | 8/2018 | Xiao | G06F 13/00 |
| 10,070,368 | B2 | * | 9/2018 | Doi | H04B 7/15 |
| 10,083,147 | B2 | * | 9/2018 | Srivastava | G06F 13/287 |
| 10,133,381 | B2 | * | 11/2018 | Huh | G06F 3/0412 |
| 10,255,018 | B2 | * | 4/2019 | Elliott | F21V 21/088 |
| 10,289,589 | B2 | * | 5/2019 | Chhor | G06F 13/4022 |
| 10,396,872 | B2 | * | 8/2019 | Miyamoto | H04L 25/067 |
| 10,425,124 | B1 | * | 9/2019 | Wang | H04B 3/36 |
| 10,430,274 | B2 | * | 10/2019 | Lee | G06F 11/1068 |
| 10,565,153 | B2 | | 2/2020 | Kashyap | |
| 10,601,425 | B2 | * | 3/2020 | Das Sharma | G06F 3/017 |
| 10,609,643 | B1 | * | 3/2020 | Le | H04B 5/0031 |
| 10,637,673 | B2 | * | 4/2020 | Brandt | H04Q 9/00 |
| 10,657,089 | B2 | * | 5/2020 | Maung | G06F 13/382 |
| 10,657,090 | B2 | * | 5/2020 | Maung | H04L 12/40032 |
| 10,667,314 | B2 | * | 5/2020 | Lee | H04W 76/15 |
| 10,673,517 | B2 | * | 6/2020 | Ashworth | H04B 7/04 |
| 10,705,594 | B2 | * | 7/2020 | Srivastava | G06F 1/3253 |
| 10,762,007 | B2 | * | 9/2020 | Yang | G06F 11/1004 |
| 10,795,835 | B2 | * | 10/2020 | Yang | G06F 11/1012 |
| 10,887,075 | B2 | * | 1/2021 | Srivastava | H04L 25/20 |
| 11,010,319 | B2 | * | 5/2021 | Maung | H04L 12/40032 |
| 11,095,359 | B2 | * | 8/2021 | Ashworth | H04B 7/04 |
| 11,121,572 | B2 | * | 9/2021 | Lin | H02J 7/0071 |
| 11,194,751 | B2 | * | 12/2021 | Chen | G06F 1/3278 |
| 11,239,843 | B2 | * | 2/2022 | Das Sharma | G06F 3/017 |
| 11,385,674 | B2 | * | 7/2022 | Jang | H03K 19/018521 |
| 11,436,173 | B2 | * | 9/2022 | Maung | H03K 5/24 |
| 2005/0270067 | A1 | * | 12/2005 | Masleid | H03K 19/01721 326/121 |
| 2008/0088343 | A1 | * | 4/2008 | Masleid | H03K 19/01721 326/23 |
| 2010/0005214 | A1 | * | 1/2010 | Trombley | G06F 13/405 710/310 |
| 2011/0128905 | A1 | * | 6/2011 | Kawauchi | H04W 88/04 370/315 |
| 2012/0170505 | A1 | * | 7/2012 | Xiao | H04B 7/15542 455/7 |
| 2014/0173157 | A1 | * | 6/2014 | Shaw | G06F 13/385 710/305 |
| 2015/0304016 | A1 | * | 10/2015 | Choi | H04B 7/2606 455/11.1 |
| 2016/0019663 | A1 | * | 1/2016 | Mani | G06Q 50/06 700/291 |
| 2016/0195902 | A1 | * | 7/2016 | Huh | G06F 1/188 345/520 |
| 2016/0233946 | A1 | * | 8/2016 | Wengrovitz | H04W 4/80 |
| 2017/0019105 | A1 | * | 1/2017 | Xiao | G06F 13/00 |
| 2017/0309570 | A1 | * | 10/2017 | Huang | H01L 23/5382 |
| 2017/0329386 | A1 | * | 11/2017 | Winemiller | G06F 1/324 |
| 2017/0331570 | A1 | * | 11/2017 | Yamane | H04B 7/15 |
| 2018/0173666 | A1 | * | 6/2018 | Srivastava | G06F 13/36 |
| 2019/0068397 | A1 | * | 2/2019 | Chen | H04L 12/40 |
| 2019/0078435 | A1 | * | 3/2019 | Song | G01V 3/26 |
| 2019/0196555 | A1 | * | 6/2019 | Mouser | H04B 7/15507 |
| 2019/0253055 | A1 | * | 8/2019 | Jang | G06F 1/10 |
| 2019/0288743 | A1 | * | 9/2019 | Wang | H04L 25/24 |
| 2019/0340146 | A1 | * | 11/2019 | Chen | H03K 5/2481 |
| 2019/0363780 | A1 | * | 11/2019 | Kahtava | H04L 47/24 |
| 2019/0373578 | A1 | * | 12/2019 | Hong | H04W 76/28 |
| 2020/0059292 | A1 | * | 2/2020 | Kim | H04W 76/27 |
| 2021/0181832 | A1 | * | 6/2021 | Ansari | G06F 13/4295 |
| 2021/0273715 | A1 | * | 9/2021 | Ashworth | G06F 1/1635 |
| 2022/0029852 | A1 | * | 1/2022 | Wu | G06F 1/3234 |
| 2022/0045743 | A1 | * | 2/2022 | Ashworth | G06F 17/14 |

FOREIGN PATENT DOCUMENTS

| | | | | | |
|---|---|---|---|---|---|
| CN | 203520099 | U | * | 4/2014 | H04B 5/00 |
| CN | 203732935 | U | * | 7/2014 | H04B 5/025 |
| CN | 207910778 | U | * | 9/2018 | H04B 5/0254 |
| CN | 110277988 | A | * | 9/2019 | H03F 1/0205 |
| CN | 210560121 | U | * | 5/2020 | H04B 5/02 |
| CN | 113972942 | A | * | 1/2022 | H04L 25/00 |
| EP | 435013 | A | * | 7/1991 | G11C 7/22 |
| EP | 1204924 | B1 | * | 1/2003 | G06F 11/2284 |
| EP | 2409284 | B1 | * | 7/2017 | G08C 17/02 |
| EP | 3698826 | A1 | * | 8/2020 | A61M 1/166 |
| EP | 3739766 | A1 | * | 11/2020 | H04B 5/02 |
| EP | 3952135 | A1 | * | 2/2022 | G06F 17/14 |
| JP | 4643647 | B2 | * | 3/2011 | H03K 17/6872 |
| JP | 4859537 | B2 | * | 1/2012 | |
| JP | 4875620 | B2 | * | 2/2012 | H03K 17/6872 |
| JP | 5642167 | B2 | * | 12/2014 | H04B 7/155 |
| JP | 5873682 | B2 | * | 3/2016 | |
| JP | 6066620 | B2 | * | 1/2017 | G06F 13/16 |
| KR | 102340748 | B1 | * | 9/2019 | H04B 3/00 |
| KR | 20190108519 | A | * | 9/2019 | H04B 3/00 |
| TW | I710222 | B | * | 1/2017 | H03K 19/00 |
| TW | I740114 | B | * | 1/2017 | H03K 19/00 |
| TW | 201921992 | A | | 6/2019 | |
| TW | 201921994 | A | | 6/2019 | |
| TW | 746083 | B1 | * | 11/2021 | H04B 5/023 |
| WO | WO-9965177 | A2 | * | 12/1999 | G06F 13/00 |
| WO | WO-0111468 | A1 | * | 2/2001 | G06F 11/2284 |
| WO | WO-2005050347 | A2 | * | 6/2005 | H04B 3/542 |
| WO | WO-2009152527 | A2 | * | 12/2009 | F21S 2/005 |

(56) References Cited

FOREIGN PATENT DOCUMENTS

| | | | | | |
|---|---|---|---|---|---|
| WO | WO-2010000622 | A1 * | 1/2010 | ........... | G06F 13/405 |
| WO | WO-2010106476 | A1 * | 9/2010 | ............. | G08C 17/02 |
| WO | WO-2012003618 | A1 * | 1/2012 | ........ | H04W 52/0245 |
| WO | WO-2012027571 | A2 * | 3/2012 | ............. | G06F 17/15 |
| WO | WO-2014024657 | A1 * | 2/2014 | ............. | G06F 13/16 |
| WO | WO-2015188154 | A1 * | 12/2015 | ............ | A61M 1/166 |
| WO | WO-2016011079 | A1 * | 1/2016 | ............. | G05B 15/02 |
| WO | WO-2015188154 | A9 * | 4/2016 | ............ | A61M 1/166 |
| WO | WO-2016111536 | A1 * | 7/2016 | ........... | G06F 1/1652 |
| WO | WO-2017014875 | A1 * | 1/2017 | ............. | G06F 13/00 |
| WO | WO-2017047945 | A1 * | 3/2017 | ........... | G06F 1/1652 |
| WO | WO-2018125501 | A1 * | 7/2018 | ........... | G06F 13/287 |
| WO | WO-2018151534 | A1 * | 8/2018 | .......... | H04W 68/005 |
| WO | WO-2018208282 | A1 * | 11/2018 | ......... | E21B 47/0228 |
| WO | WO-2020034604 | A1 * | 2/2020 | ............. | H04L 67/12 |

* cited by examiner

SIGNAL RELAY SYSTEM WITH REDUCED POWER CONSUMPTION

BACKGROUND OF THE INVENTION

1. Field of the Invention

The present invention is related to a signal relay system, more particularly to a signal relay system that can reduce power consumption.

2. Description of the Prior Art

Many common interface signal transmission systems, such as Universal Serial Bus (USB), Ethernet, High Definition Multimedia Interface (HDMI), have functions of connection detection and signal transmission. The signal transmission system generally includes a signal repeater. The repeater is used to amplify the transmission signal to farther extend the length of the network. When an electronic signal is being transmitted, the signal strength will decrease as the transmission distance increases. Therefore, a repeater is needed to amplify the signal to increase the data transmission distance. The repeater is generally implemented with signal transduction via detection of a terminal connection and a dummy terminal circuit. However, when only one end of the signal relay circuit is connected to a device and the other end is not connected, the system is sleeping. At this time, if the signal relay circuit continues to operate, it will cause unnecessary power consumption.

SUMMARY OF THE INVENTION

An embodiment provides a signal relay system including an input terminal, an output terminal, a signal detector, a signal repeater, an input terminal circuit, an output terminal circuit, a switch and a switch controller. The signal detector is coupled to the input terminal and configured to detect a wakeup signal from the input terminal. The signal repeater is coupled to the input terminal and the signal detector and configured to receive a transmission signal and to amplify and forward the transmission signal. The input terminal circuit is coupled to the input terminal, the signal repeater and the signal detector, and configured to reduce impedance between the input terminal and the signal repeater. The output terminal circuit is coupled to the signal detector, the signal repeater and the input terminal circuit, and configured to reduce impedance between the output terminal and the signal repeater. The switch is coupled to the output terminal, and configured to couple the output terminal to the signal repeater or the input terminal. The switch controller coupled to the signal detector, and configured to control the switch according to a detection result of the signal detector.

Another embodiment provides a signal relay system comprising a first input terminal, a first output terminal, a first signal detector, a first signal repeater, a first input terminal circuit, a first output terminal circuit, a first switch coupled to the first output terminal, a first switch, a first switch controller, a second input terminal, a second output terminal, a second signal detector, a second signal repeater, a second input terminal circuit, a second output terminal circuit, a second switch coupled to the second output terminal, a second switch and a second switch controller. The first input terminal is coupled to a first connector. The first output terminal is coupled to a second connector. The first signal detector is coupled to the first input terminal, and is configured to detect a first wakeup signal from the first input terminal. The first signal repeater is coupled to the first input terminal and the first signal detector, and is configured to receive a first transmission signal and to amplify and forward the first transmission signal. The first input terminal circuit is coupled to the first input terminal, the first signal repeater and the first signal detector, and is configured to reduce impedance between the first input terminal and the first signal repeater. The first output terminal circuit is coupled to the first signal detector, the first signal repeater and the first input terminal circuit, and is configured to reduce impedance between the first output terminal and the first signal repeater. The first switch is coupled to the first output terminal, and is configured to couple the first output terminal to the first signal repeater or the first input terminal. The first switch controller is coupled to the first signal detector, and is configured to control the first switch according to a first detection result of the first signal detector. The second input terminal is coupled to the second connector. The second output terminal is coupled to the first connector. The second signal detector is coupled to the second input terminal, and is configured to detect a second wakeup signal from the second input terminal. The second signal repeater is coupled to the second input terminal and the second signal detector, and is configured to receive a second transmission signal and to amplify and forward the second transmission signal. The second input terminal circuit is coupled to the second input terminal, the second signal repeater and the second signal detector, and is configured to reduce impedance between the second input terminal and the second signal repeater. The second output terminal circuit is coupled to the second signal detector, the second signal repeater and the second input terminal circuit, and is configured to reduce impedance between the second output terminal and the second signal repeater. The second switch is coupled to the second output terminal, and is configured to couple the second output terminal to the second signal repeater or the second input terminal. The second switch controller is coupled to the second signal detector, and is configured to control the second switch according to a second detection result of the second signal detector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
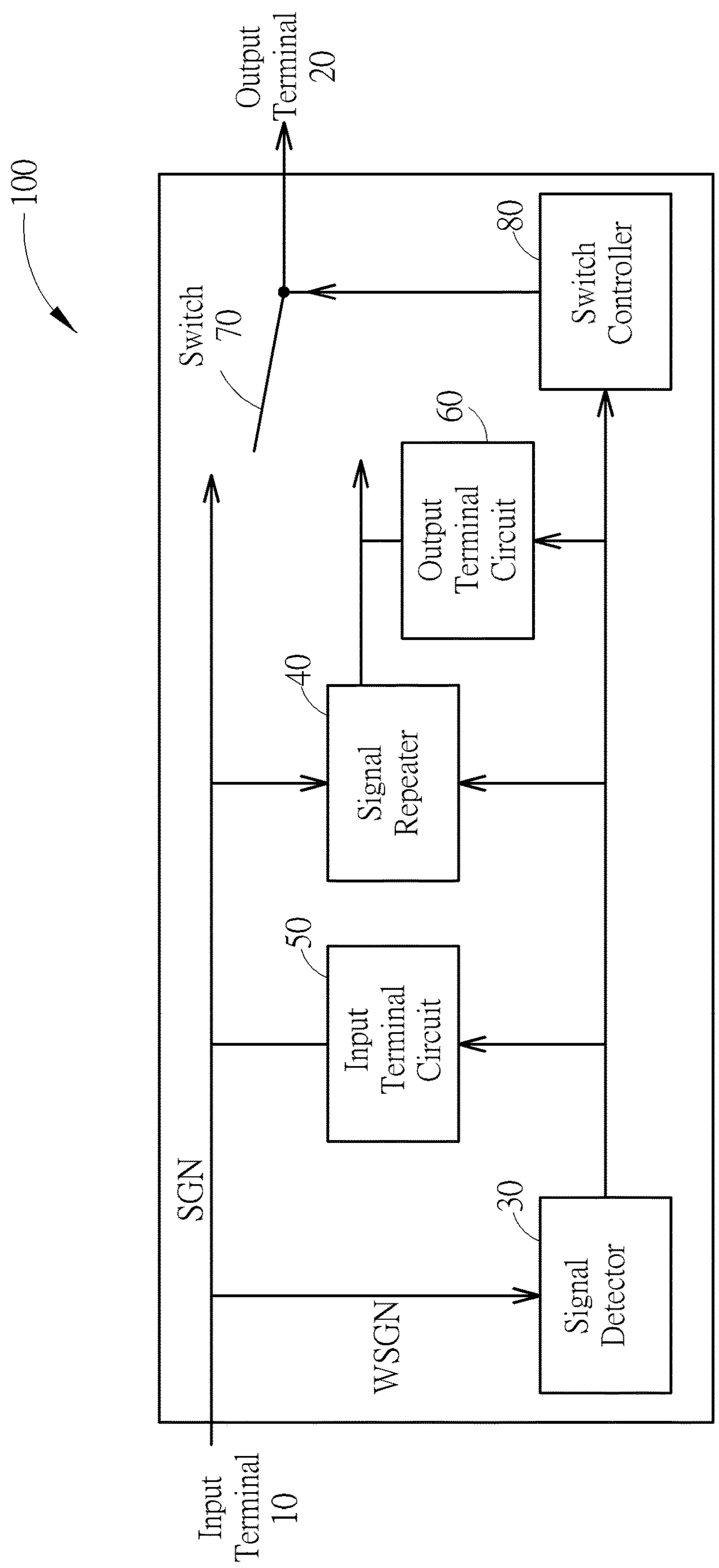
FIG. 1 is a diagram of a signal relay system of an embodiment of the present invention.

FIG. 1 is a diagram of a signal relay system 100 of an embodiment of the present invention. The signal relay system 100 includes an input terminal 10, an output terminal 20, a signal detector 30, a signal repeater 40, an input terminal circuit 50, an output terminal circuit 60, a switch 70 and a switch controller 80.

The signal detector 30 is coupled to the input terminal 10 and configured to detect a wakeup signal WSGN from the input terminal 10. The signal repeater 40 is coupled to the input terminal 10 and the signal detector 30 and configured to receive a transmission signal SGN and to amplify and forward the transmission signal SGN. The input terminal circuit 50 is coupled to the input terminal 10, the signal repeater 40 and the signal detector 30, and configured to reduce impedance between the input terminal 10 and the signal repeater 40. The output terminal circuit 60 is coupled to the signal detector 30, the signal repeater 40 and the input terminal circuit 50, and configured to reduce impedance between the output terminal 20 and the signal repeater 40. The switch 70 is coupled to the output terminal 20, and configured to couple the output terminal 20 to the signal repeater 40 or the input terminal 10. The switch controller 80 is coupled to the signal detector 30, and configured to control the switch 70 according to a detection result of the signal detector 30.

When the wakeup signal WSGN is not detected, the switch controller 80 can switch the signal relay system 100 to a short-circuit mode to couple the output terminal 20 to the input terminal 10 through the switch 70 and disable the input terminal circuit 50, the output terminal circuit 60 and signal repeater 40. At this time, in the signal transmission path, only the signal detector 30 is needed to detect the wakeup signal WSGN, such as low-frequency periodic signals, most of which are able to be transmitted through the signal transmission path without amplification.

When the input terminal 10 and the output terminal 20 are connected to an external device, a wakeup signal WSGN is issued. When the signal detector 30 detects the wakeup signal WSGN, the switch controller 80 can activate the signal relay system 100. At this time, the output terminal 20 is coupled to the signal repeater 40 through the switch 70. The input terminal circuit 50, the output terminal circuit 60, and the signal repeater 40 are all activated at the same time.

The wakeup signal WSGN can include a low frequency periodic signal (LFPS) and a low-frequency wakeup signal. The transmission signal SGN can include a universal serial bus (USB) signal, an Ethernet signal, and/or a high-definition multimedia interface (HDMI) signal.

In the prior art, in addition to the signal detector 30, a set of connection detection circuits is also needed to detect whether devices are connected between the input end and the output end. Therefore, the signal relay system of the embodiment can do the same without the connection detection circuit, and determine the connection status of the devices by signal detection alone. The circuit layout, power consumption, and design complexity of the signal relay system can be effectively improved.

Figure 2:
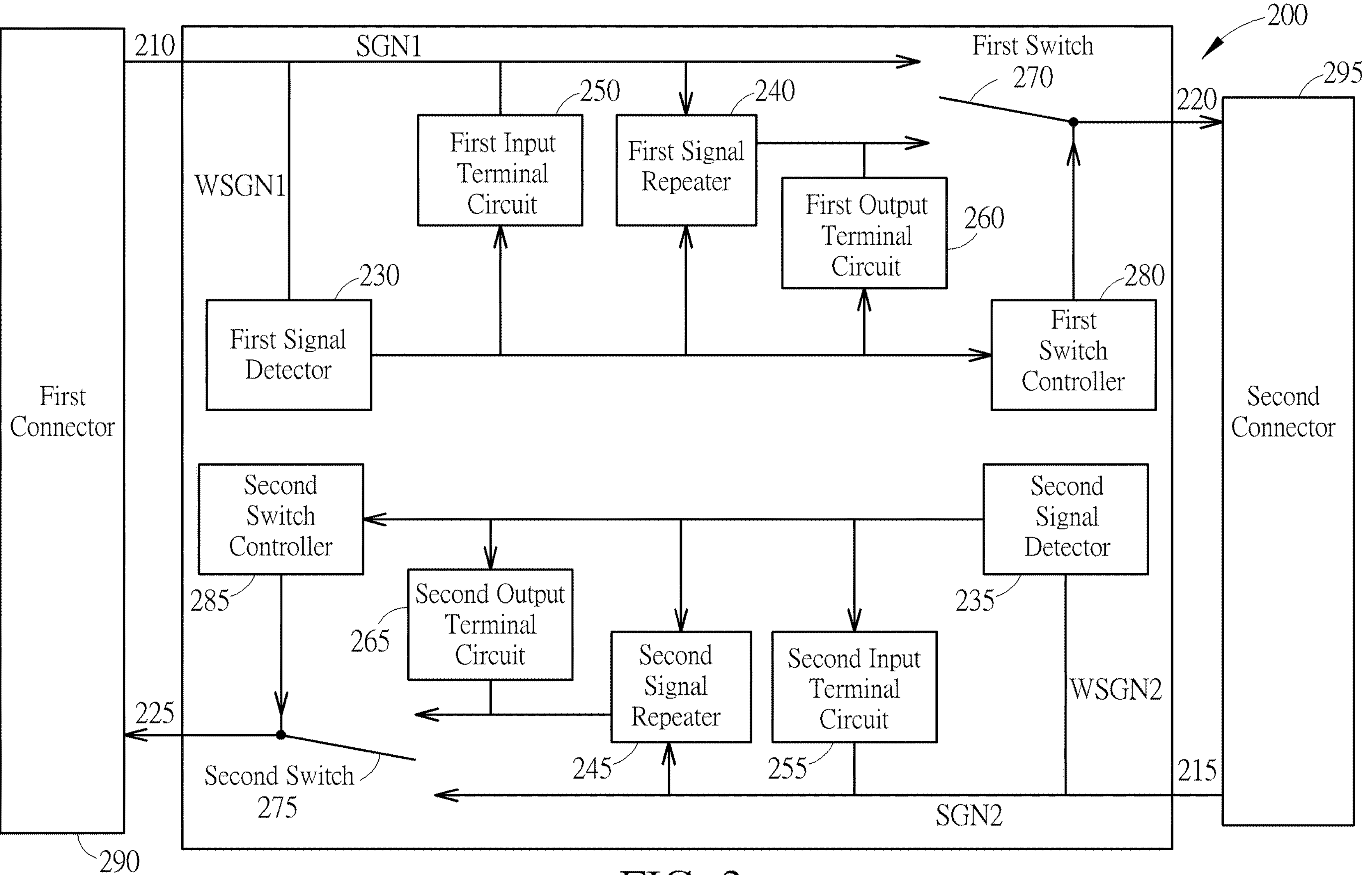
FIG. 2 is a diagram of a signal relay system of another embodiment of the present invention.

FIG. 2 is a diagram of a signal relay system 200 of another embodiment of the present invention. The signal relay system 200 includes a first input terminal 210, a first output terminal 220, a first signal detector 230, a first signal repeater 240, a first input terminal circuit 250, a first output terminal circuit 260, a first switch 270 coupled to the first output terminal 220, a first switch controller 280, a second input terminal 215, a second output terminal 225, a second signal detector 235, a second signal repeater 245, a second input terminal circuit 255, a second output terminal circuit 265, a second switch 275 coupled to the second output terminal 225, and a second switch controller 285.

The first input terminal 210 is coupled to a first connector 290. The first output terminal 220 is coupled to a second connector 295. The first signal detector 230 is coupled to the first input terminal 210, and is configured to detect a first wakeup signal from the first input terminal 210. The first signal repeater 240 is coupled to the first input terminal 210 and the first signal detector 230, and is configured to receive a first transmission signal and to amplify and forward the first transmission signal. The first input terminal circuit 250 is coupled to the first input terminal 210, the first signal repeater 240 and the first signal detector 230, and is configured to reduce impedance between the first input terminal 210 and the first signal repeater 240. The first output terminal circuit 260 is coupled to the first signal detector 230, the first signal repeater 240 and the first input terminal circuit 250, and is configured to reduce impedance between the first output terminal 220 and the first signal repeater 240. The first switch 270 is coupled to the first output terminal 220, and is configured to couple the first output terminal 220 to the first signal repeater 240 or the first input terminal 210. The first switch controller 280 is coupled to the first signal detector 230, and is configured to control the first switch 270 according to a first detection result of the first signal detector 230. The second input terminal 215 is coupled to the second connector 295. The second output terminal 225 is coupled to the first connector 290. The second signal detector 235 is coupled to the second input 215 terminal, and is configured to detect a second wakeup signal from the second input terminal 215. The second signal repeater 245 is coupled to the second input terminal 215 and the second signal detector 235, and is configured to receive a second transmission signal and to amplify and forward the second transmission signal. The second input terminal circuit 255 is coupled to the second input terminal 215, the second signal repeater 245 and the second signal detector 235, and is configured to reduce impedance between the second input terminal 215 and the second signal repeater 245. The second output terminal circuit 265 is coupled to the second signal detector 235, the second signal repeater 245 and the second input terminal circuit 255, and is configured to reduce impedance between the second output terminal 225 and the second signal repeater 245. The second switch 275 is coupled to the second output terminal 225, and is configured to couple the second output terminal 225 to the second signal repeater 245 or the second input terminal 215. The second switch controller 285 is coupled to the second signal detector 235, and is configured to control the second switch 275 according to a second detection result of the second signal detector 235.

When the first wakeup signal WSGN1 is not detected, the first switch controller 280 can control the first switch 270 to couple the first output terminal 220 to the first input terminal 210, and disable the first input terminal circuit 250, the first output terminal circuit 260 and the first signal repeater 240. At this time, in the signal transmission path, only the first signal detector 230 is needed to detect the first wakeup signal WSGN1, such as low-frequency periodic signals, most of which are able to be transmitted through the signal transmission path without amplification. The second wakeup signal WSGN2 controls the circuit in the same way, and the description will not be repeated here.

When the first input terminal 210 and the second output terminal 225 are connected to an external device through the first connector 290, and the second input terminal 215 and the first output terminal 220 are connected to an external device through the second connector 295, the first wakeup signal WSGN1 and the second wakeup signal WSGN2 can be issued respectively.

When the first signal detector 230 detects the first wakeup signal WSGN1, the first switch controller 280 can control the first switch 270 to couple the first output terminal 220 to the first signal repeater 240 and activate the first input terminal circuit 250, the first output terminal circuit 260 and the first signal repeater 240 at the same time. When the second signal detector 235 detects the second wakeup signal WSGN2, the second switch controller 285 can control the second switch 275 to couple the second output terminal 225 to the second signal repeater 245 and activate the second input terminal circuit 255, the second output terminal circuit 265 and the second signal repeater 245 at the same time.

The first wakeup signal WSGN1 and the second wakeup signal WSGN2 each can include a low frequency periodic signal (LFPS) and a low-frequency wakeup signal. The first transmission signal SGN1 and the second transmission signal SGN2 each can include a universal serial bus (USB) signal, an Ethernet signal, and/or a high-definition multimedia interface (HDMI) signal.

In summary, the signal relay system of the embodiment utilizes the design combination of signal detectors, signal repeaters, input terminal circuits, output terminal circuits, switches, and switch controllers to separately detect signals and determines the connection status of the device. Therefore, the circuit layout, power consumption and design complexity of the signal relay system can be effectively improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal relay system comprising:

a first input terminal coupled to a first connector;

a first output terminal coupled to a second connector;

a first signal detector, coupled to the first input terminal, and configured to detect a first wakeup signal from the first input terminal;

a first signal repeater, coupled to the first input terminal and the first signal detector, and configured to receive a first transmission signal and to amplify and forward the first transmission signal;

a first input terminal circuit, coupled to the first input terminal, the first signal repeater and the first signal detector, and configured to reduce impedance between the first input terminal and the first signal repeater;

a first output terminal circuit, coupled to the first signal detector, the first signal repeater and the first input terminal circuit, and configured to reduce impedance between the first output terminal and the first signal repeater;

a first switch coupled to the first output terminal, and configured to couple the first output terminal to the first signal repeater or the first input terminal;

a first switch controller, coupled to the first signal detector, and configured to control the first switch according to a first detection result of the first signal detector;

a second input terminal coupled to the second connector;

a second output terminal coupled to the first connector;

a second signal detector, coupled to the second input terminal, and configured to detect a second wakeup signal from the second input terminal;

a second signal repeater, coupled to the second input terminal and the second signal detector, and configured to receive a second transmission signal and to amplify and forward the second transmission signal;

a second input terminal circuit, coupled to the second input terminal, the second signal repeater and the second signal detector, and configured to reduce impedance between the second input terminal and the second signal repeater;

a second output terminal circuit, coupled to the second signal detector, the second signal repeater and the second input terminal circuit, and configured to reduce impedance between the second output terminal and the second signal repeater;

a second switch coupled to the second output terminal, and configured to couple the second output terminal to the second signal repeater or the second input terminal; and a second switch controller, coupled to the second signal detector, and configured to control the second switch according to a second detection result of the second signal detector.

2. The signal relay system of claim 1, wherein when the first signal detector does not detect the first wakeup signal, the first switch controller controls the first switch to couple the first output terminal to the first input terminal, and disables the first signal repeater, the first input terminal circuit and the first output terminal circuit.

3. The signal relay system of claim 1, wherein when the second signal detector does not detect the second wakeup signal, the second switch controller controls the second switch to couple the second output terminal to the second input terminal, and disables the second signal repeater, the second input terminal circuit and the second output terminal circuit.

4. The signal relay system of to claim 1, wherein when the first signal detector detects the first wakeup signal, the first switch controller controls the first switch to couple the first output terminal to the first signal repeater, and activates the first signal repeater, the first input terminal circuit and the first output terminal circuit.

5. The signal relay system of to claim 1, wherein when the second signal detector detects the second wakeup signal, the second switch controller controls the second switch to couple the second output terminal to the second signal repeater, and activates the second signal repeater, the second input terminal circuit and the second output terminal circuit.

6. The signal relay system of claim 1, wherein the first wakeup signal and the second wakeup signal each comprise a low frequency periodic signal (LFPS) and a low-frequency wakeup signal.

7. The signal relay system of claim 1, wherein the first transmission signal and the second transmission signal each comprise a universal serial bus (USB) signal, an Ethernet signal, and/or a high-definition multimedia interface (HDMI) signal.

* * * * *